United States Patent [19]
Shiga et al.

[11] Patent Number: 5,570,110
[45] Date of Patent: Oct. 29, 1996

[54] OPERATIONAL INPUT APPARATUS

[75] Inventors: Sadakazu Shiga; Masaru Komatsu; Minoru Numata, all of Iwaki, Japan

[73] Assignee: Alps Electric Co., Ltd., Tokyo, Japan

[21] Appl. No.: 439,007

[22] Filed: May 11, 1995

[30] Foreign Application Priority Data

May 25, 1994 [JP] Japan .................................. 6-111291

[51] Int. Cl.$^6$ ...................................................... G09G 5/00
[52] U.S. Cl. .......................... 345/156; 345/161; 345/163; 273/148 B
[58] Field of Search .................................... 345/156, 157, 345/161, 163, 167, 168, 173; 273/148 B, 438; 74/471 XY

[56] References Cited

U.S. PATENT DOCUMENTS

| | | | |
|---|---|---|---|
| 4,588,187 | 5/1986 | Dell | 273/148 B |
| 4,816,810 | 3/1989 | Moore | 345/156 |
| 5,245,320 | 9/1993 | Bouton | 345/167 |
| 5,414,422 | 5/1995 | Allen | 345/168 |
| 5,421,590 | 6/1995 | Robbins | 273/148 B |

*Primary Examiner*—Mark R. Powell
*Assistant Examiner*—Matthew Luu
*Attorney, Agent, or Firm*—Guy W. Shoup; Patrick T. Bever

[57] ABSTRACT

An operational input apparatus having an internal input apparatus and an external additional input apparatus wherein the internal data obtained by the operation of the internal input apparatus and the external data obtained by the operation of the external additional input apparatus are selectively transferred to an equipment main body and including: a changeover circuit for changing over the connection to the equipment main body; a data detector for detecting the change in the internal data and the external data separately; an internal data counter and an external data counter which start counting at the detection of the respective changes in the internal and the external data and clear the count values after a predetermined period of time; and a changeover controller which controls a switch to change over periodically and alternately when the count values of the internal data counter and the external data counter are both zero, and when a count value is obtained, controls the switch to change over to the side wherein the count value is obtained.

2 Claims, 3 Drawing Sheets

OPERATIONAL INPUT APPARATUS

BACKGROUND OF THE INVENTION

1. Field of the Invention

The present invention relates to an operational input apparatus such as a keyboard and in particular it relates to an operational input apparatus which comprises an internal input apparatus such as a stick system coordinate input apparatus and an external additional input apparatus such as a mouse to be connected to an internal circuit, and the data obtained in the operation of such input apparatuses are selectively transferred to an equipment main body such as a personal computer.

2. Description of the Related Art

Among keyboards, the following four types are known to the public: a keyboard apparatus having only various kinds of keys being disposed in a predetermined order in an operational portion (hereinafter referred to as a first type keyboard apparatus), a keyboard apparatus having various kinds of keys being disposed in a predetermined order and a stick system coordinate input apparatus being disposed at a predetermined place between the above-mentioned operational keys (hereinafter referred to as a second type keyboard apparatus), a keyboard apparatus of the first type having a configuration added with an external mouse which can be connected to the internal circuit (hereinafter referred to as a third type keyboard apparatus), and a keyboard apparatus of the second type having a configuration added with an external mouse which can be connected to the internal circuit (hereinafter referred to as a fourth type keyboard apparatus). In the case of the first type keyboard apparatus, it is arranged that the data obtained by the operation of a key are transferred to the equipment main body such as a personal computer, and in the case of the second type keyboard apparatus and the third type keyboard apparatus, when the stick system coordinate input apparatus or the external mouse is operated, it is arranged that the data obtained by the operation of them and the data obtained by the operation of a key are separately transferred to the equipment main body such as a personal computer. In the case of the fourth type keyboard apparatus, while the external mouse is connected to the keyboard, the data obtained by the operation of a key and the data obtained by the operation of the mouse are transferred to the equipment main body, but the data obtained by the operation of the stick system coordinate input apparatus are not transferred to the equipment main body such as a personal computer.

As described in the above, in the case of the fourth type keyboard apparatus, while an external mouse is connected to the keyboard, it is arranged that the data obtained by the operation of a key and the data obtained by the operation a mouse can be transferred to the equipment main body; therefore, after the data obtained by the operation of the mouse is transferred to the equipment main body, even if the data obtained by the operation of the stick system coordinate input apparatus is intended to be transferred to the equipment main body, as far as the mouse is not disconnected from the keyboard, the data cannot be transferred to the equipment main body.

As described in the above, in the case of a conventional key-board apparatus, there has been a problem that when the stick system coordinate input apparatus is operated after an external mouse is operated, if it is forgotten to disconnect the mouse from the keyboard apparatus, all the operational data obtained by the stick system coordinate input apparatus thereafter are nullified.

Further in the case of a conventional keyboard apparatus, when the operation of an external mouse and the operation of the stick system coordinate input apparatus are alternately required, every time when the operation with a mouse is initiated or ended, the mouse has to be connected or disconnected from the keyboard; thereby, an extremely complicated operation has to be performed.

SUMMARY OF THE INVENTION

The present invention was invented to solve the problems as mentioned above, and an object of the invention is to offer an operational input apparatus in which when an internal input apparatus and an external additional input apparatus are used in combination, nullification of the operation with the internal input apparatus does not occur and improvement in operability can be devised.

In order to achieve the above-mentioned object, an operational input apparatus according to the present invention having an internal input apparatus and an external additional input apparatus and in which the internal data obtained by the internal input apparatus and the external data obtained by the external additional input apparatus are selectively transferred to an equipment main body comprises: a changeover means which selectively changes over the connection to the equipment main body to the internal input apparatus side or to the external additional input apparatus side; a data detection means which separately detects the change in the internal data and the change in the external data; an interior privileged timer means which starts counting when the data detection means detects the change in the internal data and keeps counting of the change in the internal data for a predetermined period of time; an exterior privileged timer means which starts counting when the data detection means detects the change in the external data and keeps counting of the change in the external data for a predetermined period of time; and a changeover control means which inputs the count values of the interior privileged timer means and the exterior privileged timer means and controls the changeover means to be changed over alternately and periodically when both count values are zero, and when a count value is obtained, controls the changeover means to be changed over to the input apparatus side wherein the change in data is detected.

In the case of an operational input apparatus according to the present invention (a keyboard apparatus for example), the supply (change) of data obtained by the operation of the internal input apparatus (a stick system coordinate input apparatus for example) and the supply (change) of data obtained by the operation of the external input apparatus (a mouse for example) are separately detected and when the supply (change) of neither internal data nor external data are found, the internal input apparatus or the external input apparatus is alternately and periodically connected to the equipment main body. When the supply (change) of internal data is detected, after the detection of the stop of supply (re-change) until a first period of time is elapsed, only the internal input apparatus is connected to the equipment main body, and on the other hand, when the supply of external data is detected, after the detection of the stop of supply (re-change) until a second period of time is elapsed only the external input apparatus is connected to the equipment main body.

As described in the above, in the case of an operational input apparatus (a keyboard for example) according to the present invention, regardless of the fact that the external additional input apparatus (a mouse for example) is connected to the operational input apparatus or not, the internal data obtained by the operation of the internal input apparatus (a stick system coordinate input apparatus for example) can be always supplied to the equipment main body, so that no nullification is made to occur by the connection of the external additional input apparatus to the operational input apparatus, and further there is no need to connect the external input apparatus to the operational input apparatus or to disconnected the external input apparatus from the operational input apparatus every time the external additional input apparatus is operated; therefore, an operational input apparatus which is excellent in operability can be obtained.

DESCRIPTION OF THE PREFERRED EMBODIMENTS

Figure 1:
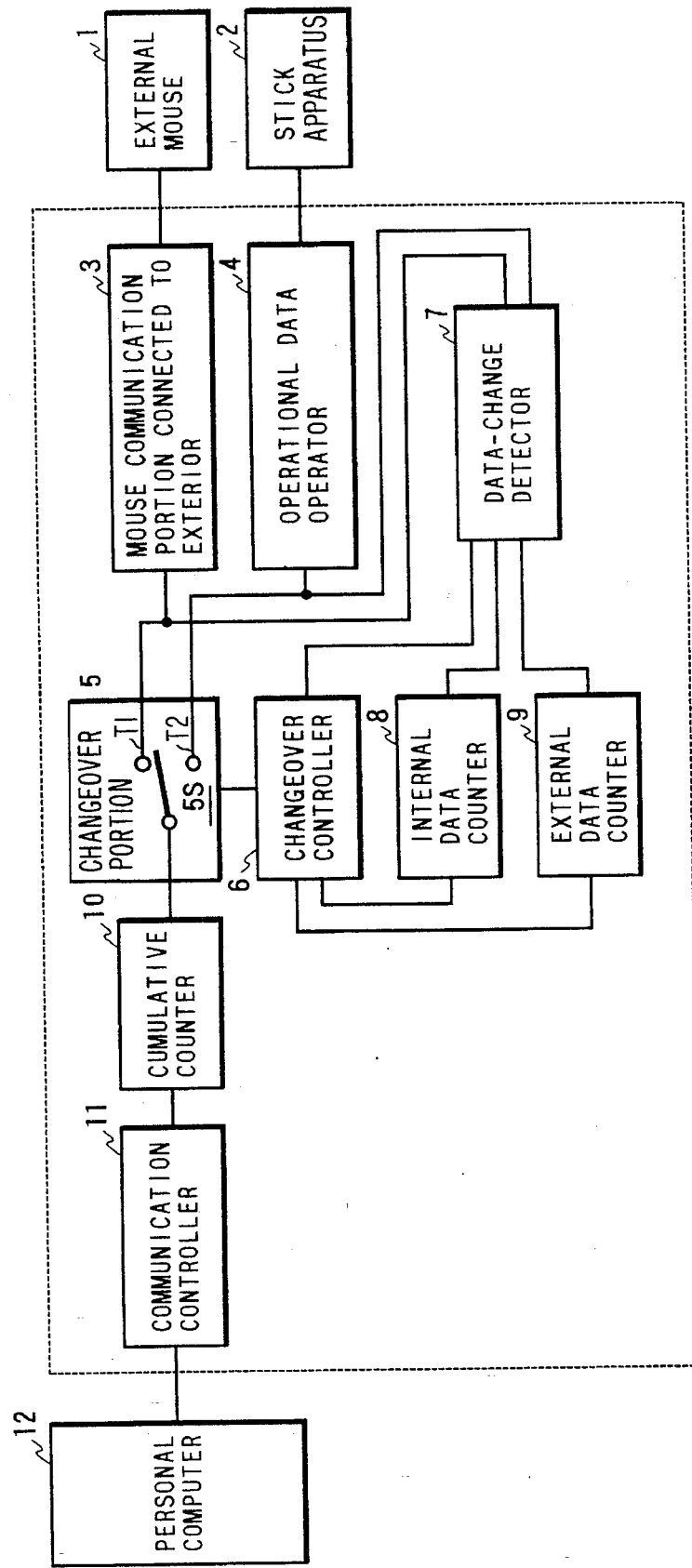
FIG. 1 is a block diagram showing a first embodiment of the operational input apparatus according to the present invention.

The preferred embodiments according to the present invention will be explained referring to the drawings in the following.

FIG. 1 is a block diagram showing the first embodiment of the operational input apparatus according to the present invention, and a keyboard apparatus is shown as an example of the operational input apparatus.

In FIG. 1, an external mouse 1 (external additional input apparatus) is connected to the keyboard from the exterior, and the output circuit is connected to a mouse communication portion 3. A stick system coordinate input apparatus 2 (internal input apparatus) is disposed in a predetermined place between operational keys (not shown in a drawing), and the output circuit is connected to an operational data operator 4. The external mouse communication portion 3 issues a command in detecting that the mouse 1 is connected to the keyboard apparatus, and at the same time it transfers the external data expressing the movement quantity of the mouse 1 to a following changeover portion 5. The operational data operator 4 averages displacement quantity of the stick system coordinates input apparatus 2 and converts the average value to a movement quantity and transfers it to the following changeover portion 5 as an internal data showing the movement quantity. The changeover portion (changeover means) 5 comprises a switch a switch 5s comprising a single circuit having two contact points; and one movable contact point terminal T1 is connected to the external mouse communication portion 3 and the other movable contact point terminal T2 is connected to the operational data operator 4. A changeover controller 6 controls the changeover operation of the switch 5s of the changeover portion 5, and it is connected to a data change detector 7, an internal data counter 8 and an external data counter 9. The data change detector 7 generates an external detection output or an internal detection output in detecting the change in the external data or the internal data respectively, and input circuit is connected to the external mouse communication portion 3 and the operational data operator 4 and the output circuit is connected to the internal data counter 8, the external data counter 9 and the changeover controller 6. The internal data counter (interior privileged timer means) 8 counts the internal detection output of the data change detector 7 and maintains the count value for a first period of time after the stop of supply of the internal detection output, and the output circuit is connected to the changeover controller 6. The external data counter (exterior privileged timer means) 9 counts the change in the external data and maintains the count value for a second period of time after the stop of the supply of the external detection output, and the output circuit is connected to the changeover controller 6. A cumulative counter 10 accumulates the input data expressing movement quantity, and after the lapse of a predetermined period of time, it sends out the accumulated data as output data, and the input circuit is connected to the fixed contact point terminal of the switch 5s and the output circuit is connected to a communication controller 11. The communication controller 11 transfers the output data to the personal computer 12 (equipment main body).

A keyboard apparatus in the first embodiment being constituted as described in the above is operated as shown below.

When neither the external mouse 1 nor the internal stick system coordinates input apparatus 2 is operated, the external data is not sent out to the output circuit of the external mouse communication portion 3 and the internal data is not sent out to the output circuit of the operational data operator 4, so that the change in the external data and the internal data is not detected by the data change detector 7, and the external detection output and the internal detection output are not generated. Thereby, the count of the internal detection output in the internal data counter 8 and the count of the external detection output in the external data counter 9 are not started and the count values of the internal data counter 8 and the external data counter 9 to be supplied to the changeover controller 6 are both zero, so that the changeover controller 6 controls the switch 5s to change alternately and periodically, every 10 msec for example, over to one movable contact point terminal T1 side or to the other movable contact point terminal T2 side.

When the stick system coordinates input apparatus 2 is operated and the external mouse 1 is not operated, the internal data is sent out to the output circuit of the operational data operator 4, so that the change in the internal data is detected by the data change detector 7 and the internal detection output is generated by the data change detector 7 and it is supplied to the internal data counter 8. At this time, the internal data counter 8 is set by the supply of the internal detection output and starts counting the internal detection output which is input subsequently, and the count value is supplied to the changeover controller 6. When a count value of the internal data counter 8 is input to the changeover controller 6, it controls the switch 5s to change over to the internal data transmission line side, that is, to the other movable contact point terminal T2 side. Thereby, the internal data which is sent out to the output circuit of the operational data operator 4 are supplied to the cumulative counter 10 through the switch 5s, and after they are accumulated in the counter for a predetermined period of time, 100 msec for example, they are taken out as output data, and the data are transferred to a personal computer 12 through the communication controller 11.

In this state, when the operation of the stick system coordinates input apparatus 2 is stopped and the sending out of the internal data is stopped, the detection of the change in the internal data is not performed by the data change detector 7 and the supply of the internal detection output to the internal data counter 8 from the data change detector 7 is stopped. At this time, after the supply of the internal detection output is stopped, the internal data counter 8 keeps the previous count value for a predetermined first period of time, 350 msec for example, so that the previous count value is kept being supplied to the changeover controller 6, and it controls the switch 5s to be in a state of being changed over to the internal data transmission line side, that is, to the other movable contact point terminal T2 side. After the lapse of the first period of time, 350 msec for example, the previous count value in the internal data counter 8 is cleared, so that zero count value is supplied to the changeover controller 6; thereby, the switch 5s is again controlled to operate changeover operation from one movable contact point terminal T1 side to the other movable contact point terminal T2 side or vice versa alternately and periodically, every 10 msec for example.

Even when the operation of the stick system coordinates input apparatus is stopped, if the operation is resumed before the lapse of the first period of time, 350 msec, the internal data counter 8 is returned to an initial state and keeps the count value again until the elapse of further 350 msec.

When the stick system coordinates input apparatus 2 is not operated and the external mouse 1 is operated, since the external data is sent out to the output circuit of the external mouse communication portion 3, the change in the external data is detected by the data change detector 7, and the external detection output generated by the data change detector 7 is supplied to the external data counter 9. At this time, the external data counter 9 is set by the supply of the external detection output, and the count of the input external detection output is started, and the count value is supplied to the changeover controller 6. When a count value of the external data counter 9 is input to the changeover controller 6, the switch 5s is controlled to change over to the external data transmission line side, that is, to the one movable contact point terminal T1 side. Thereby, the external data sent out to the output circuit of the external mouse communication portion 3 is supplied to the cumulative counter 10 through the switch 5s, and after they are accumulated for a predetermined period of time, 100 msec for example, the accumulated data are taken out as output data and the data are transferred to the personal computer 12 through the communication controller 11.

In this state, when the operation of the external mouse is stopped and the sending out of the external data is stopped, the detection of the change in the external data by the data change detector 7 is not executed and the supply of the external detection output to the external data counter 9 from the data change detector 7 is stopped. In this case, after the stop of the supply of the external detection output, the external data counter 9 maintains the previous count value for a predetermined second period of time, 100 msec for example, so that the previous count value is kept on being supplied to the changeover controller 6, and the switch 5s is controlled to change over to the external data transmission line side, that is, to the one movable contact point terminal T1 side and kept as it is. After the lapse of the predetermined second period of time, 100 msec for example, the previous count value in the external data counter 9 is cleared and zero count value is supplied to the changeover controller 6. Thereby the switch 5s is controlled again to change over alternately and periodically, every 10 msec for example, from the one movable contact point terminal T1 side to the other movable contact point terminal T2 side or vice versa.

Even if the operation of the external mouse 1 is stopped, if the operation of the external mouse 1 is resumed before the lapse of the second period of time, 100 msec, the external data counter 9 is returned to an initial state and maintains the previous count value until the lapse of 100 msec.

Figure 2:
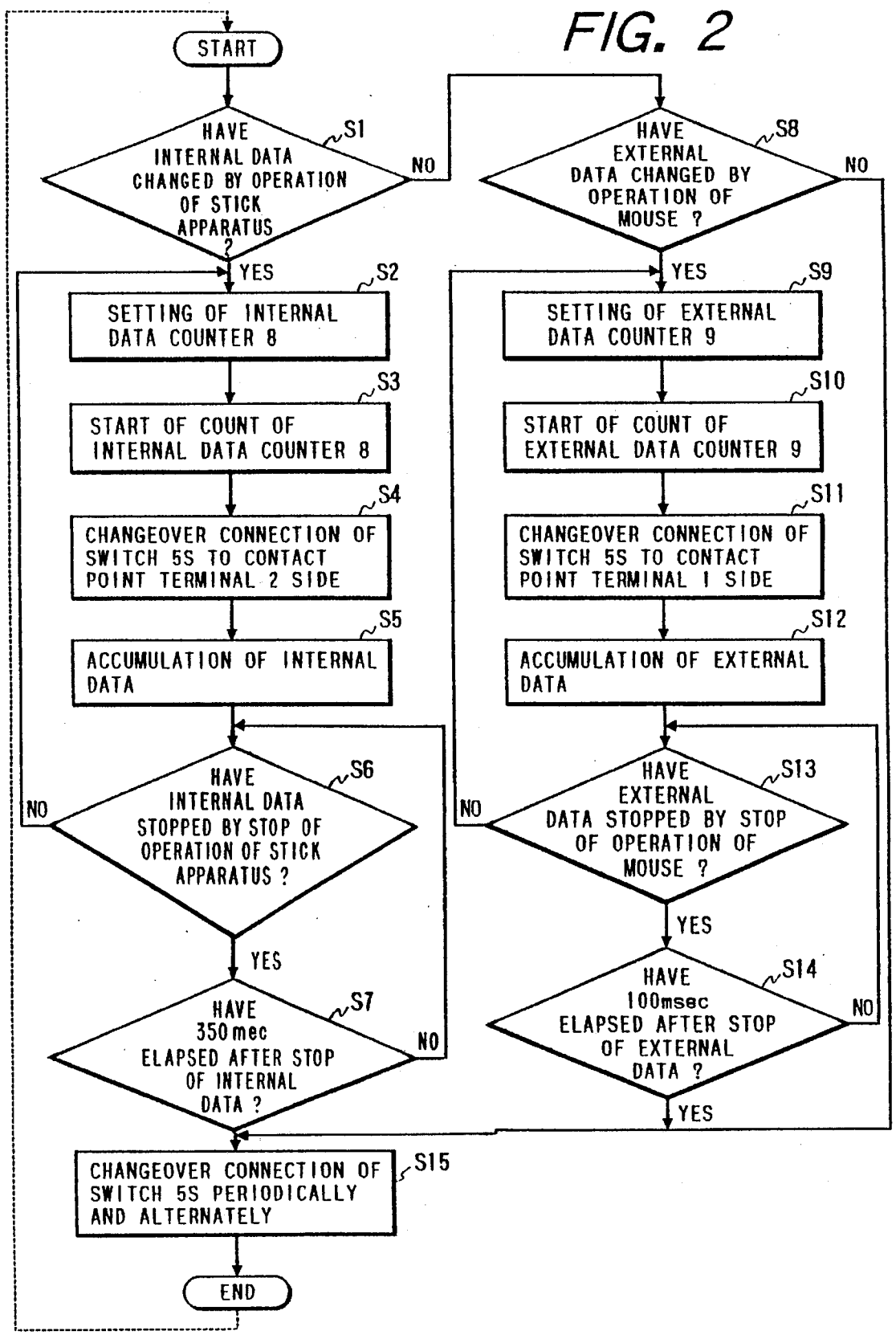
FIG. 2 is a flow chart expressing principal operation of the operational input apparatus in the first embodiment shown in FIG. 1.

FIG. 2 is a flow chart expressing collectively the principal operation in the first embodiment such as the detection of the change in data and the changeover operation of the switch 5s after the detection of the change in data.

The principal operation in the first embodiment will be explained again using the flow chart. It is assumed that in the initial state, the switch 5s in the changeover portion 5 is changed over periodically and alternately by the changeover controller 6.

At first in step S1, the data change detector 7 judges whether internal data are newly supplied by the operation of the stick system coordinates input apparatus 2 or not (whether internal data are changed or not). When it judges that internal data are newly supplied (Y), step S2 is taken, and when it judges that new data are not supplied (N), another step S8 is taken.

In step S2, the internal data counter 8 receives internal detection output from the data change detector 7 to be a set state.

In step S3, the internal data counter 8 starts counting with the supply of the internal detection output.

In step S4, the count value is supplied from the internal data counter 8 to the changeover controller 6; thereby, the switch 5s is controlled to change over to the movable contact point terminal T2 side.

In step S5, the cumulative counter 10 accumulates internal data supplied through the switch 5s, and the data are transferred to the personal computer 12 through the communication controller 11 as output data every 100 msec.

In step S6, the data change detector 7 judges whether the supply of internal data is stopped by the stop of operation of the stick system coordinates input apparatus or not (whether internal data are changed again or not). When it judges that the supply is stopped (Y), the next step S7 is taken but when it judges that the supply is not stopped (N), the process is returned to step S2.

In step S7, the internal data counter 8 judges whether it has elapsed 350 msec after the stop of supply of the internal data or not. When it judges that it has elapsed 350 msec (Y), step S15 is taken but when it judges not (N), the process is returned to step S6.

Further, the data change detector 7 judges whether external data are newly supplied by the operation of the external mouse 1 or not (whether the external data are changed or not). When it is judged that the external data are newly supplied (Y), the next step S9 is taken but if it is judged that they are not yet supplied, the last step S15 is taken.

In step S9, the external data counter 9 is made to be in a set state in receiving an external detection output from the data change detector 7.

In step S10, the external data counter 9 starts counting with the supply of the external detection output.

In step S11, the changeover controller 6 controls the switch 5s to change over to the movable contact point terminal T1 side with the supply of a count value from the external data counter 9.

In step S12, the cumulative counter 10 accumulates external data supplied through the switch 5s and transfers the data every 100 msec as output data to the personal computer 12 through the communication controller 11.

In step S13, the data change detector 7 judges whether the supply of external data is stopped by the stop of operation of the external mouse 1 or not (whether external data are re-changed or not). When it is judged that the supply of external data is stopped (Y), step S14 is taken but when it is judged that the supply of external data is not stopped (N), the process is returned to step S9.

In step S14, the external data counter 9 judges whether after the stop of supply of external data, 100 msec have elapsed or not. When it is judged that 100 msec have elapsed (Y), the last step S15 is taken, but when it is judged that 100 msec have not elapsed ((N), the process is returned to S13.

In step S15, since the supply of a count value to the changeover controller 6 from both internal data counter 8 and external data counter 9 is stopped, the changeover controller 6 controls the switch 5s to change over periodically and alternately, and when the series of steps of operation are finished, it is returned to an initial state, and again the series of steps of operation are executed.

In the present embodiment, a keyboard apparatus is taken up as an example of an equipment input apparatus; however, the equipment input apparatus according to the present invention is not limited to a keyboard, and other apparatuses similar to a keyboard can be used.

In the present embodiment, explanation is given about the case where the stick system coordinate input apparatus 2 is used as an internal input apparatus and the external mouse 1 is used as an external additional input apparatus; however the internal input apparatus and the external additional input apparatus are not limited to those described in the above, and other apparatuses for example, a track ball in place of the stick system coordinate input apparatus 2 and a tablet in place of the external mouse 1, can be used.

Further in the present embodiment, explanation is given about a case where the changeover period of the switch 5s is 10 msec and the data takeout period from the cumulative counter 10 is 100 msec; however, the values of respective periods are only examples and they are not limited to the values shown in the embodiments.

Besides the above, in the explanation of the present embodiment, it is explained about the first period of time or the second period of time, that is, from the time when the supply of internal or external detection output is stopped until the time when the count value of the internal or external data counter 8 or 9 is cleared, that the first period of time is set to be longer than the second period of time; such a difference in a period of time is provided to give higher priority to the operation of the internal input apparatus, a stick pointer 2 for example, than the operation of the external additional input apparatus, an external mouse 1 for example; if such priority in operation is not needed, the first period of time and the second period of time can be set to be equal. Even though the numerical values of the first and the second periods of time shown in the embodiments are desirable values, the values are not limited to the above-mentioned numerical values and they can be changed properly.

Figure 3:
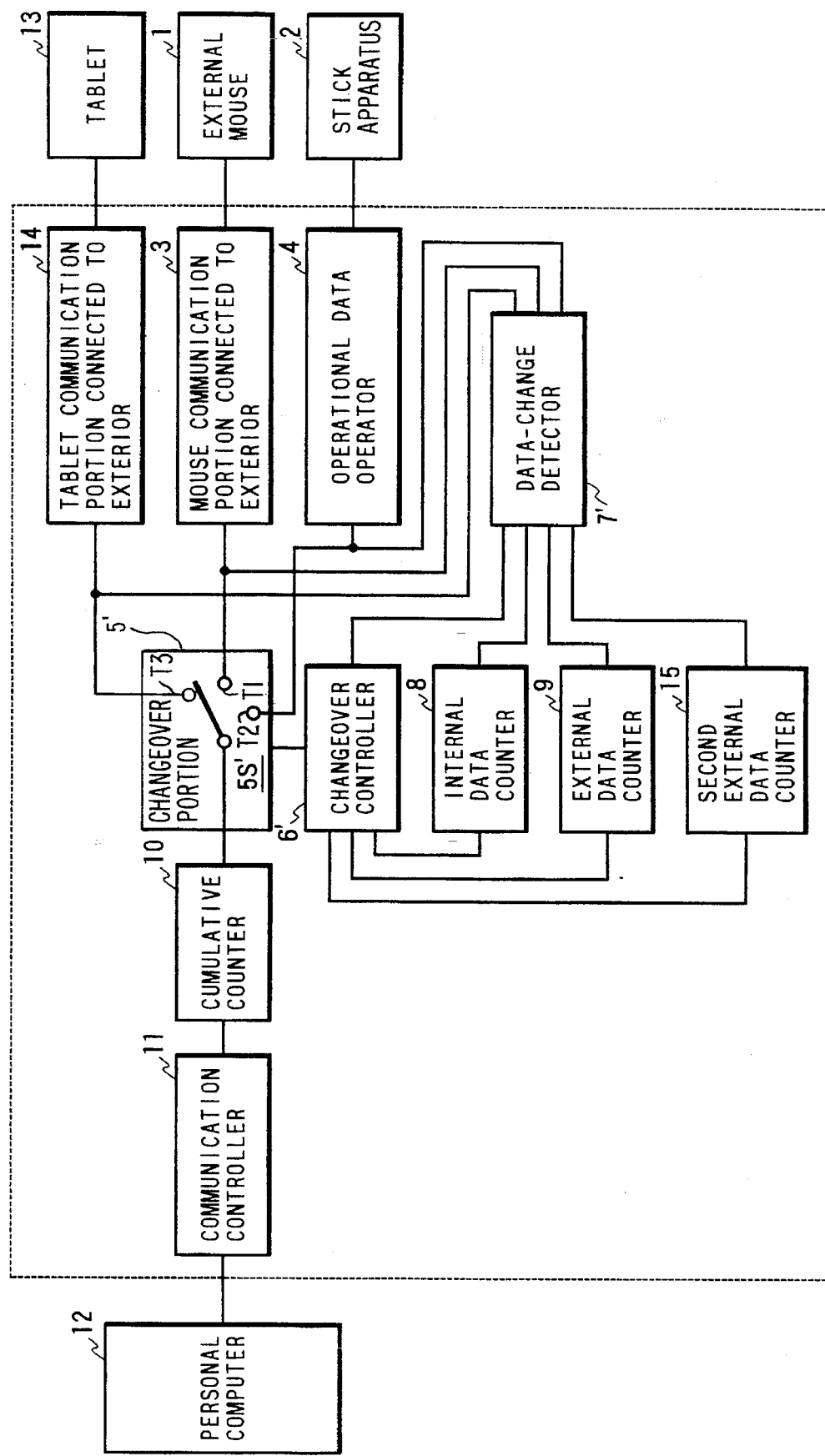
FIG. 3 is a block diagram showing a second embodiment of the operational input apparatus according to the present invention.

FIG. 3 is a block diagram showing a second embodiment of the operational input apparatus according to the present invention, and a keyboard is taken up as an example of the operational input apparatus.

The different points between the present second embodiment and the first embodiment will be explained: in the first embodiment, the external additional input apparatus is composed of an external mouse 1, but in the second embodiment, external additional input apparatuses are composed of an external mouse 1 and a tablet 13; in association with this, the switch 5s comprising a single circuit having two contact points is used in the changeover portion 5 in the first embodiment, but in the second embodiment, a switch 5s' comprising; a single circuit having three contact points is used in a changeover portion 5'; the second embodiment is provided with an external tablet communication portion 14 and a second external data counter 15 which are not provided in the first embodiment; and in the second embodiment, the connections of a changeover controller 6' and a data change detector 7' are a little different from the connections of the changeover controller 6 and the data change detector 7. There is no other different point from those mentioned in the above in the configurations of the first embodiment and the second embodiment.

The operation in the second embodiment is almost the same as that in the first embodiment, so that the detailed explanation on the operation of the second embodiment will be omitted. However in the second embodiment, when the data change detector 7' does not detect any of the following, internal data, a first external data from the external mouse 1 or a second external data from the tablet 13, the changeover controller 6' controls the switch 5s' to change over periodically and alternately among 3 fixed contact point terminals, T1, T2 and T3, and on the other hand, when the data change detector 7' detects the supply (change) of any data from among the internal data, the first external data or the second external data, the changeover controller 6' controls the switch 5s' to change over to a fixed contact point terminal being connected to a circuit where detected data exist, to a fixed contact point terminal (T3) for example.

In the second embodiment, a track ball can be also used in place of the stick system coordinates input apparatus 2 as an internal input apparatus, and two external mice 1 or two external mice 1 and a tablet 13 can be used in place of the external mouse 1 and the tablet 13 as external additional input apparatuses.

What is claimed is:

1. An operational input apparatus, having an internal input apparatus and an external additional input apparatus, for selectively transferring one of (a) internal data generated by operation of said internal input apparatus and (b) external data generated by the operation of said external additional input apparatus to an equipment main body, the operational input apparatus comprising:

a changeover means for selectively changing a connection to said equipment main body between said internal input apparatus and said external additional apparatus;

a data detection means for detecting a change in the generation of said internal data and a change in the generation of said external data;

an interior privileged timer means which starts counting when said data detection means detects the change in said internal data and continues counting for a predetermined period of time;

an exterior privileged timer means which starts counting when said data detection means detects the change in said external data and continues counting for a predetermined period of time; and a changeover control means for receiving the count values from said interior privileged timer means and said exterior privileged timer means and for controlling said changeover means to:

(i) periodically and alternately connect said equipment main body to said internal input apparatus and said external input apparatus in a case where both count values of said interior privileged timer means and said exterior privileged timer means are zero, (ii) connect said equipment main body to said internal input apparatus when the count value received from the interior privileged timer means reaches a first predetermined value, and (iii) connect said equipment main body to said external input apparatus when the count value received from the exterior privileged timer means reaches a second predetermined value.

2. An operational input apparatus according to claim 1, wherein said internal input apparatus is a stick system coordinate input apparatus, said external apparatus is a mouse, and said operational input apparatus is a keyboard.

\* \* \* \* \*